Patented May 21, 1935

2,001,925

UNITED STATES PATENT OFFICE 2,001,925

PROCESS FOR THE MANUFACTURE OF STARCHES

Francis H. Thurber, Washington, D. C., dedicated to the free use of the Public

No Drawing. Application August 15, 1932, Serial No. 628,890

5 Claims. (Cl. 127—66)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without payment to me of any royalty thereon.

I hereby dedicate the invention herein described, to the free use of the Public, to take effect upon the granting of a patent to me.

This invention relates to the production of starch, more particularly to the removal of colored compounds which are present in or are developed by oxidation in the raw material from which the starch is produced.

The invention is not limited to the production of any one starch, but may be applicable to all starches. It has been found to be particularly applicable to the production of sweet potato starch, and the details of the method hereinafter given apply particularly to sweet potatoes and to sweet potato starch production.

It is an object of this invention to provide an improved process for the removal of colored compounds derived from the raw material from which the starch is produced, by the use of alkaline sulphite solutions or by the use of other alkaline reducing agents, such as sodium sulphide solution. Any adverse effect of the alkaline reducing agent may be controlled by varying the concentration of the reducing agent.

Another object of this invention is to provide a process whereby a more pure starch is produced. The sodium salts of the colored compounds are soluble in water and are washed out of the starch in the manufacturing process.

A third object of the invention is to provide a process whereby a greater yield of starch is obtained from the raw material because of the softening and solvent action of the alkaline reducing agent on the fibrous cells in the raw material which enclose the starch granules. When this fibrous material is softened, the starch granules are more easily separated from the pulp, and thus the recovery of starch from the raw material is increased.

A fourth object of the invention is to provide a process whereby the manufacturing time is lowered. In the case of starches such as sweet potato starch, the manufacturing time is lowered to that required for the manufacture of high grade white potato starch. This is accomplished by the elimination of certain processes, such as regrinding and numerous tabling operations, which have previously been essential in the purification process.

I am aware of the procedure developed by Balch and Paine (Industrial and Engineering Chemistry, volume 23, pages 1205–1213 (1931)). In their procedure an acid, namely, sulphurous acid, rather than an alkaline, reducing agent was used. This medium does not bring about the objects enumerated above.

With the above objects in view, I have set forth my invention in the following specification and have indicated certain specific embodiments of my invention by way of illustration, and not as a limitation.

*Manufacturing procedure.*—Sweet potatoes were ground in a hammer mill. The resulting pulp was treated during the grinding period with an equal weight of alkaline sulphite solution— 0.02 M sulphur dioxide (0.128%) and 0.085 M sodium hydroxide (0.34%). The pulp was allowed to stand for approximately five minutes after the grinding period was completed, after which it was passed over a shaker covered with 200 mesh bolting cloth. The starch was then recovered from the starch milk by means of a solid bowl centrifuge.

*Purification.*—The crude starch was purified by tabling and by further treatment with alkaline sulphite solution.

An alkaline sulphite solution—0.0012 M $SO_2$ (0.008%) and 0.005 M sodium hydroxide (0.02%)—was added to the starch in sufficient amount to form an approximately 5% suspension. The starch was then tabled. After the first tabling, the starch in a number of runs appeared to be quite pure. However, to insure the production of a high-grade product, the treatment with alkaline sulphite and the tabling process were repeated. After the second tabling, in order to remove the excess alkali, the starch was taken up in sufficient water to form a 5% suspension, the mixture was agitated for 5 minutes, and was then filtered. In some runs a small commercial vacuum filter was used, but, since the process was not continuous, leaf vacuum filters were found to be more convenient.

To complete the purification process, the starch was again taken up in water, after which the mixture was acidified (pH5, determined colorimetrically with brom cresol green). Acetic acid was used in bringing about the acidification. However, other acids may be used. The starch was filtered again, washed on the filter with water (pH5), and dried at a temperature of 125° F.

*Yield.*—The yield of starch from a typical run in which 444 pounds of potatoes were used was 64 pounds—14.41%—of first grade starch, moisture content 13.8%, and 18 pounds—4.05%—of second grade starch, moisture content 13.8%. The total yield of starch—moisture content 13.8%—was 82 pounds, or 18.46%.

As many apparently widely different embodiments of this invention may be made without departing from the spirit and scope thereof, it is understood that I do not limit myself to the specific embodiments thereof, except as defined in the appended patent claims.

Having fully disclosed my discovery, I claim as my invention:

1. A process for the manufacture of starch which comprises treating a freshly ground sweet potato pulp with an alkaline sodium sulphite solution.

2. A process for the manufacture of starch which comprises treating a freshly ground sweet potato pulp with a sodium sulphide solution, and separating the starch from the resulting mixture.

3. A process for the manufacture of starch which comprises treating a freshly ground sweet potato pulp with an alkaline sodium sulphite solution, allowing the mixture to stand for approximately five minutes, passing the mixture over a shaker covered with 200 mesh bolting cloth, to remove the pulp, separating the starch from the resulting starch suspension by centrifuging, purifying the starch by further treating with an alkaline sodium sulphite solution tabling the resulting mixture to remove foreign material from the starch, preparing a five per cent aqueous suspension of the tabled starch, and filtering the suspension to remove excess alkali, adding water to the filtered starch, bringing the suspension to an acidity of approximately pH5, filtering the mixture, and drying the filtered starch.

4. The process of manufacturing starch which comprises treating freshly ground sweet potato pulp with a chemical solution selected from the group consisting of a sodium sulphite solution and a sodium sulphide solution, and separating the starch from the resulting material.

5. The process of manufacturing starch which comprises treating freshly ground sweet potato pulp with an alkaline reducing agent selected from the group consisting of sulphites and sulphides, and separating the starch from the resulting material.

FRANCIS H. THURBER.